R. BRYSON.
Reaping Machine.
No. 56,522.
2 Sheets—Sheet 1.
Patented July 24, 1866.
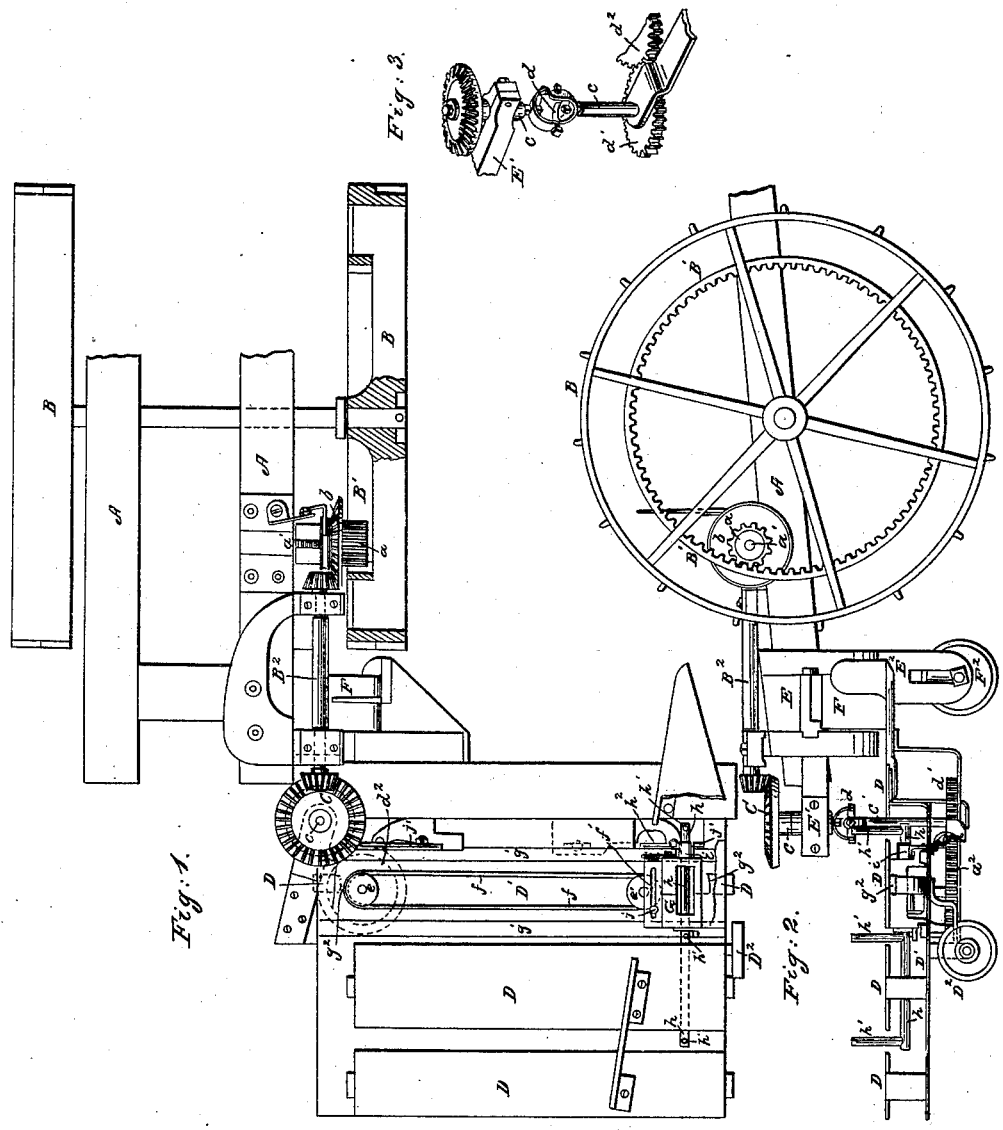
Witnesses:
W. Campbell.
Edw. Schafer.
Inventor:
Robt Bryson
by his Attys.
Mason, Fenwick & Lawrence.

R. BRYSON.
Reaping Machine.
No. 56,522.
2 Sheets—Sheet 2.
Patented July 24, 1866.
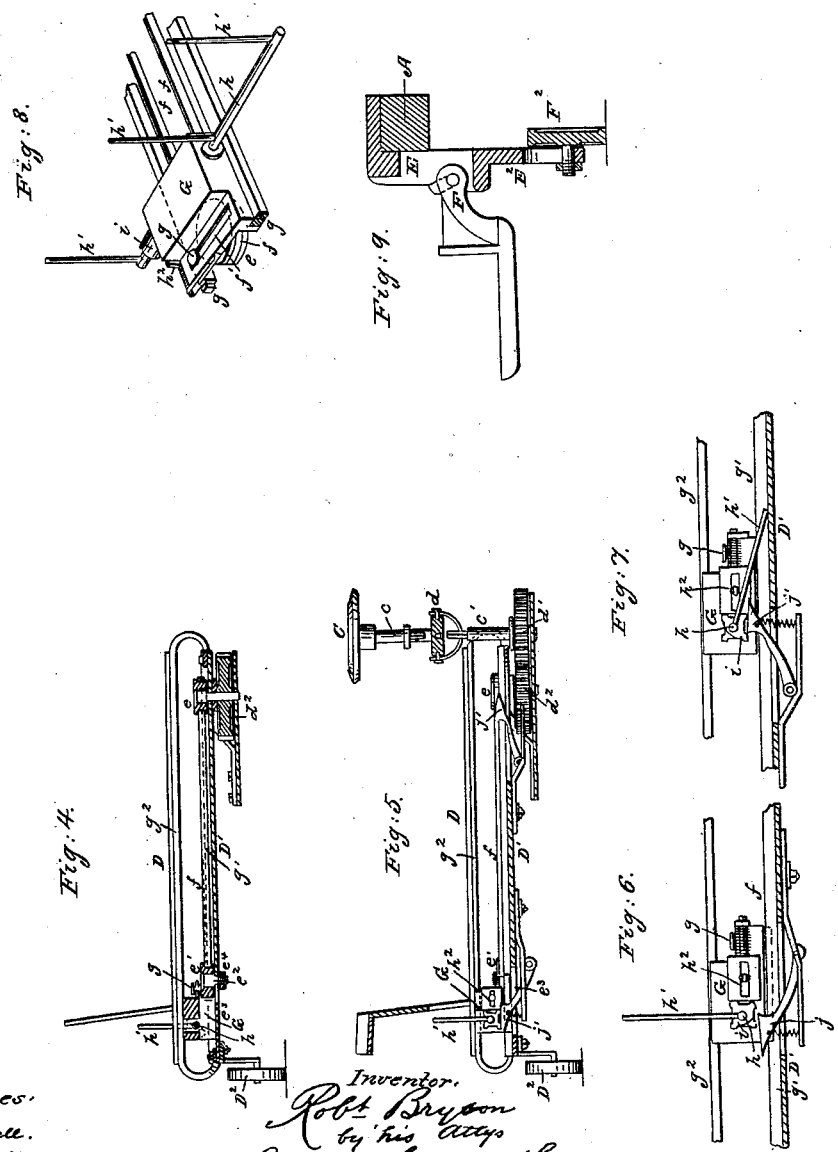

UNITED STATES PATENT OFFICE.

ROBERT BRYSON, OF SCHENECTADY, NEW YORK.

IMPROVEMENT IN REAPING-MACHINES.

Specification forming part of Letters Patent No. 56,522, dated July 24, 1866.

*To all whom it may concern:*

Be it known that I, ROBERT BRYSON, of Schenectady, in the county of Schenectady and State of New York, have invented certain new and useful Improvements in Harvesting-Machines; and I do hereby declare that the following is a full, clear, and exact description thereof, reference being had to the accompanying drawings, making a part of this specification, in which—

Figure 1 is a plan view of a portion of the frame and platform of a harvester having my improvements applied. Fig. 2 is a side elevation of the same. Fig. 3 is a perspective view of the jointed driving-shaft for moving the rake. Fig. 4, Sheet 2, is a section through the platform taken in a vertical plane through the rake movements. Fig. 5 is a section through the platform taken in a vertical plane in front of the rake movements. Fig. 6 is an enlarged view, showing the position of the parts just after the rake-teeth have been erected. Fig. 7 is a similar view, showing the rake-teeth depressed. Fig. 8 is a perspective view of the rake and its sliding block. Fig. 9 is a vertical sectional view, showing the mode of connecting, by a joint, the platform to the main draft-frame.

Similar letters of reference indicate corresponding parts in the several figures.

This invention relates to certain new and useful improvements on reaping-machines having automatic rakes which reciprocate across the platform at right angles to the line of draft, so as to deliver the grain in gavels in rear of the draft-frame.

The invention also relates to an improvement in operating a reciprocating rake which is supported by and upon a platform that is hinged to the draft-frame so as to have independent movements of this frame.

To enable others skilled in the art to understand my invention, I will describe its construction and operation.

The draft-frame A is mounted upon two transporting-wheels, B B, one of which engages with a pinion spur-wheel, $a$, by means of the inside gear, B', and rotates this wheel when the machine is moved forward or backward. The wheel $a$ turns loosely upon a fixed shaft, $a'$, and engages with a bevel-spur wheel, $b$, on this shaft, when said wheel is rotated forward, but when rotated backward it does not move the bevel-wheel. This bevel-wheel $b$ engages with a pinion spur-wheel on a longitudinal shaft, $B^2$, which shaft carries on its rear end another pinion, that communicates motion to a horizontal bevel-wheel, C, that is keyed on a short shaft, $c$, having its bearings in a projection, E', of a casting, E, as shown in Figs. 2 and 3. This short shaft is connected to a shaft, $c'$, by means of a gimbal or universal joint, $d$, as will be hereinafter further explained. The shaft $c'$ has its bearing upon a depression of the platform, and to its lower end a spur-wheel, $d'$, is keyed, which engages with a corresponding wheel, $d^2$, that is keyed on a shaft having a belt-wheel, $e$, applied to it. By this arrangement of gearing the belt-wheel $e$ is rotated when the machine is moved forward, in whatever position the platform may be.

The platform proper is made up of slats D D, which are arranged at right angles to the line of draft, with spaces between them for the passage of rake-teeth. These slats are secured to a frame, D', upon which the rake movements are supported, so that the rake-head can move back and forth across the platform and beneath the slatted surface thereof. This platform is sustained upon a wheel, $D^2$, at its outer end, and by the draft-frame A at its inner and forward end.

The platform is attached to the draft-frame A by a loose-hinged joint, which will allow the outer end of the platform to rise and fall about a center, and which will allow the inner end of the platform to rise and fall also. Thus the platform can either vibrate or rise and fall bodily. This joint consists of a portion, F, which projects up from a plate to which the platform is bolted. Said portion F has pivots projecting from its front and rear sides, which enter slots which are made in the front and rear vertical portions of the frame or casting E, as shown in Figs. 2 and 9. A vertically-slatted projection, $E^2$, of the casting E serves as a bearing for a wheel, $F^2$, which sustains the rear part of the draft-frame, as shown in Fig. 2.

The gimbal-joint $d$ will allow the platform to vibrate freely about its hinge-joint connection; but in order to allow the platform to rise and fall bodily the ends of the two shafts $c\ c'$ are made square and fitted loosely into corresponding sockets in the gimbal-joints, as shown in Figs. 3 and 5. This will form an extensible connection and admit of the movements of the platform above described; at the same time the rake will receive its movements across the platform uninterruptedly.

An endless belt, $f$, is passed around the wheel $e$, and also around a corresponding wheel, $e'$, and kept under proper tension by having the pulley $e'$ attached to an adjustable screw-pin, $e^2$, which is fitted in a slot, $e^3$, formed in the frame $D'$, as shown, and clamped in any given position by means of a jam-nut, $e^4$. This belt is connected by an upright pin, $g$, to a sliding block, G, which moves upon two parallel ways, $g'\ g'$, and which is kept in place upon these ways or rails by means of a bar, $g^2$, which fits into a slot in the top of said block G. This block is hollowed out on its bottom side to allow it a free passage over the pulleys or belt-wheels $e\ e'$, and it is also constructed with a slot through it for receiving the pin $g$ and allowing this pin to pass round the pulleys $e\ e$ at the terminations of the strokes of the block G. It is by means of the pin $g$, which is attached to the belt $f$, and the slot $f'$ through the block G, that this block is caused to move back and forth the width of the platform or the distance required.

The rake-head $h$ passes longitudinally through the reciprocating block G, and has teeth $h'\ h'\ h'$ applied to it, which project up through the spaces between the slats D during the raking-stroke, and which are depressed, as shown in Fig. 7, during the return stroke of the rake. The rake-head $h$ has a rectangular enlargement, $i$, on it, which is acted upon by a spring-plate, $h^2$, (shown in Figs. 5, 6, and 7,) and also by two spring-hooks, $j\ j'$, which are located near the inner and outer ends of the platform, in front of the ways upon which the block G slides. These hooks $j\ j'$ are held up in proper position by springs, and they arrest the block $i$ and give a quarter-turn to the rake. The hook $j$ elevates the rake-teeth just before the rake completes its return stroke after delivering a gavel, and the hook $j'$ depresses the rake-teeth at the opposite side of the platform just before the termination of the raking-stroke of the rake. The spring-plate $h^2$ is intended for keeping the rake-teeth in the position given to them by the hooks $j\ j'$.

The tilting hooks, sliding carrier G, and other contrivances which I have above described for actuating the rake are all suitably protected by means of guards, so that they will not be deranged by stubble or loose straw.

Having thus described my invention, what I claim as new, and desire to secure by Letters Patent, is—

1. The arrangement of the gimbal or universal joint $d$ with the two parts $c\ c'$ of an extensible shaft, when one part of said shaft drives an endless belt which operates a reciprocating rake arranged to move through a slatted platform, and the other part is attached to the draft-frame and transmits the motion of the driving-wheels to the gearing which drives the rake, in combination with a hinged-joint harvester, all in such manner that one part of the extensible shaft maintains an unchanging position with respect to the grain-platform and the other part thereof maintains an unchanging position with respect to the draft-frame, as set forth.

2. The construction and arrangement of the parts $c\ c'\ d$ for the purpose of forming an extensible-joint shaft for a hinged-joint harvester with a rake attachment, substantially as herein described.

3. The construction, arrangement, and combination of the rake-head carrier G, rails $g'\ g'$ and $g^2$, rake-head $i$, spring-slide $h^2$, spring-catches $j\ j'$, pin $g$, and endless belt $f\ f$, substantially as and for the purpose set forth.

4. The combination of the slot $e^3$, adjustable pin $e^2$, endless rake-moving belt $f\ f$, and reciprocating rake $h\ h'$, substantially as and for the purpose described.

5. The combination of the rake-head carrier G, rake $h\ h'\ i$, spring-catches $j\ j'$, spring-slide $h^2$, and endless belt, substantially as and for the purpose set forth.

6. The rectilinear-moving rake, spur-gears $d\ d'$, and section $c'$ of extensible shaft, arranged on a hinged-joint platform, as described, in combination with the gimbal or universal joint $d$, section $c$ of extensible shaft, bevel-gears, and draft-frame, all arranged and operating substantially in the manner herein described.

ROBT. BRYSON.

Witnesses:
ANDREW WYLIE,
JAMES VAN KURAN.